United States Patent
Yang et al.

(10) Patent No.: US 11,713,428 B2
(45) Date of Patent: Aug. 1, 2023

(54) GASIFICATION REACTOR ADAPTABLE FOR FEEDSTOCK WITH WIDE PARTICLE SIZE DISTRIBUTION

(71) Applicant: HUAZHONG UNIVERSITY OF SCIENCE AND TECHNOLOGY, Hubei (CN)

(72) Inventors: Haiping Yang, Hubei (CN); Xianhua Wang, Hubei (CN); Jingai Shao, Hubei (CN); Kuo Zeng, Hubei (CN); Yingquan Chen, Hubei (CN); Xiong Zhang, Hubei (CN); Qing Yang, Hubei (CN); Shihong Zhang, Hubei (CN); Hanping Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/879,769

(22) Filed: Aug. 2, 2022

(65) Prior Publication Data
US 2023/0095044 A1 Mar. 30, 2023

(30) Foreign Application Priority Data

Sep. 6, 2021 (CN) .......................... 202111036055.4

(51) Int. Cl.
*C10J 3/20* (2006.01)
*C10J 3/48* (2006.01)
(Continued)

(52) U.S. Cl.
CPC ................ *C10J 3/721* (2013.01); *C10J 3/20* (2013.01); *C10J 3/463* (2013.01); *C10J 3/48* (2013.01);
(Continued)

(58) Field of Classification Search
None
See application file for complete search history.

(56) References Cited

U.S. PATENT DOCUMENTS 1,592,467 A * 7/1926 Rosenthal ................. C10B 1/04
  201/37
3,779,893 A * 12/1973 Leas ....................... C10G 1/083
  208/417

FOREIGN PATENT DOCUMENTS

CN   109022038 A * 12/2018  ............... C10J 3/56
DE   19841586 A1 * 3/2000  ................ C10J 3/02

* cited by examiner

Primary Examiner — Jennifer A Leung
(74) Attorney, Agent, or Firm — JCIPRNET

(57) ABSTRACT

The disclosure belongs to the technical field of solid fuel utilization and discloses a gasification reactor adaptable for feedstock with wide particle size distribution, including a reactor body. The reactor body is composed of a first reaction chamber, a second reaction chamber, and a third reaction chamber, which are connected with each other. The side wall of the first reaction chamber is provided with a first vent for introducing a gasification agent to fluidize the fine feedstock particles in the first reaction chamber and the gasification reaction occurs. The bottom of the second reaction chamber is provided with a second vent for introducing an oxidant to react with the coarse feedstock particles in the second reaction chamber. The bottom of the third reaction chamber is provided with a third vent for introducing a gasification agent to fluidize and gasify the incompletely reacted particles in the third reaction chamber.

7 Claims, 2 Drawing Sheets

(51) Int. Cl.
*C10J 3/72* (2006.01)
*C10J 3/84* (2006.01)
*C10J 3/86* (2006.01)
*C10J 3/46* (2006.01)

(52) U.S. Cl.
CPC . *C10J 3/84* (2013.01); *C10J 3/86* (2013.01); *C10J 2300/12* (2013.01); *C10J 2300/1603* (2013.01)

GASIFICATION REACTOR ADAPTABLE FOR FEEDSTOCK WITH WIDE PARTICLE SIZE DISTRIBUTION

CROSS-REFERENCE TO RELATED APPLICATION

This application claims the priority benefit of China application serial no. 202111036055.4, filed on Sep. 6, 2021. The entirety of the above-mentioned patent application is hereby incorporated by reference herein and made a part of this specification.

BACKGROUND

Technical Field

The disclosure belongs to the technical field of solid fuel utilization, and more particularly relates to a gasification reactor adaptable for feedstock with wide particle size distribution.

Description of Related Art

As a very important energy conversion method, gasification plays an important role in the utilization of solid fuels such as coal, biomass, and garbage. The main products of gasification are syngas mainly composed of hydrogen and carbon monoxide. The syngas may be directly burned for electricity and heat generation, and may also be used to produce liquid fuels and chemicals through chemical synthesis.

At present, the main types of gasification equipment are fixed bed gasifier and fluidized bed gasifier. Atmospheric fixed bed gasifiers mainly include mixed producer, UGI water gas gasifier (atmospheric fixed bed coal gasification equipment), water gas gasifier, two-stage mixed producer, and two-stage water gas gasifier, and are characterized by simple operation and low investment. However, the fixed bed gasifier needs to use a given feedstock with consistent shape and size. Fluidized bed gasifiers are characterized by enhanced gas-solid heat and mass transfer processes, facilitating the utilization of gasification agent and efficient gasification, but are only applicable for small feedstock particles. The actual solid fuels have a wide range of sources and different properties, making it difficult to crush them into feedstock particles with required size for the existing gasification equipment, which often leads to problems such as poor gasification performance.

SUMMARY

In view of the defects of the conventional technologies, the purpose of the present disclosure is to provide a gasification reactor adaptable for feedstock with wide particle size distribution. By setting up multi-stage reaction chambers to provide suitable gasification atmospheres for feedstock with different particle size ranges, it is possible to solve the problem of poor gasification performance in the existing gasification equipment when using the solid fuels with wide particle size distribution.

In order to achieve the above purpose, the present disclosure provides a gasification reactor adaptable for feedstock with wide particle size distribution, which includes a reactor body consisting of a first reaction chamber, a second reaction chamber, and a third reaction chamber. These three chambers are connected with each other. The top of the first reaction chamber is provided with a feed inlet and a gas outlet.

Both the second reaction chamber and the third reaction chamber are located below the first reaction chamber, and the third reaction chamber is sleeved on the outer periphery of the second reaction chamber. The side wall of the first reaction chamber is provided with a first vent, through which gasification agent is introduced to fluidize the fine feedstock particles in the first reaction chamber and the gasification reaction occurs. The bottom of the second reaction chamber is provided with a second vent, through which oxidant is introduced to react with the coarse feedstock particles in the second reaction chamber. At the bottom of the third reaction chamber, a third vent is configured for introducing gasification agent to fluidize and gasify the incompletely reacted particles in the third reaction chamber.

Preferably, a gas collecting device is provided in the first reaction chamber, including a gas collecting hood with a bottom opening and a gas duct. The gas collecting hood is close to the top of the first reaction chamber, and one end of the gas duct is connected to the top of the gas collecting hood, and the other end of the gas duct is connected to the gas outlet.

Preferably, the gas collecting hood is conical and located directly below the feed inlet.

Preferably, a plurality of angle-adjustable louvers are provided at the bottom opening of the gas collecting hood.

Preferably, an inclined annular distributor is provided near the bottom of the first reaction chamber, which divides the interior of the first reaction chamber into a first annular gas chamber. In this manner, the gasification agent introduced through the first vent enters the first annular gas chamber, and then is evenly spread into the first reaction chamber through holes on the annular distributor.

Preferably, at least one first gas-solid separator is arranged in the circumferential direction near the top of the second reaction chamber. The same number of through holes as the first gas-solid separators are opened on the interior wall between the second reaction chamber and the third reaction chamber. The inlet of the first gas-solid separator is connected to the third reaction chamber via the through hole, and the gas outlet of the first gas-solid separator is connected to the first annular gas chamber.

Preferably, the cross section of the first gas-solid separator is square and it has a cylindrical chamber inside, and the chamber wall is made of corundum mullite materials.

Preferably, the reactor body also includes a distributor spanning the second reaction chamber and the third reaction chamber. The distributor divides the interior of the second reaction chamber into an oxidant gas chamber. In this manner, the oxidant introduced through the second vent enters the oxidant gas chamber, and then is evenly spread into the second reaction chamber through holes on the distributor. The distributor divides the interior of the third reaction chamber into a second annular gas chamber. In this manner, the gasification agent introduced through the third vent enters the second annular gas chamber, and then is evenly spread into the third reaction chamber through holes on the distributor.

Preferably, flow control valves are provided on the pipelines connecting the first vent, the second vent, and the third vent.

Preferably, the gasification reactor of the present disclosure further includes a heat exchange device. The reactor body further includes a cooling slag chamber located below the third reaction chamber, and two chambers are connected with each other. The side wall of the cooling slag chamber is provided with one inlet and at least one outlet of heat exchange medium. The inlet of heat exchange medium is connected to the outlet of the heat exchange device, and the outlet of heat exchange medium is connected to the inlet of the heat exchange device.

Preferably, the heat exchange device includes a high-temperature heat exchanger and a low-temperature heat exchanger. Two outlets of heat exchange medium are arranged along the height of the cooling slag chamber. The upper outlet of heat exchange medium is connected to the heat flow inlet of the high-temperature heat exchanger. The lower outlet of heat exchange medium is connected to the heat flow inlet of the low-temperature heat exchanger. Furthermore, the heat flow inlet of the low-temperature heat exchanger is also connected to the cold flow outlet of the high-temperature heat exchanger. The heat flow outlet of the high-temperature heat exchanger is connected to the first vent and the third vent. The heat flow outlet of the low-temperature heat exchanger is connected to the second vent. The cold flow outlet of the low-temperature heat exchanger is connected to the inlet of heat exchange medium.

Preferably, the gasification reactor of the present disclosure further includes a second gas-solid separator and a waste heat recovery equipment. The inlet of the second gas-solid separator is connected to the gas outlet of the first reaction chamber, and the gas outlet of the second gas-solid separator is connected to the inlet of the waste heat recovery equipment.

Preferably, the waste heat recovery equipment is a steam generator, whose outlet is connected to the cold flow inlet of the high-temperature heat exchanger.

In general, compared with the conventional technologies, the above technical solutions conceived by the present disclosure have the following advantages.

(1) The gasification reactor of the present disclosure is provided with three interconnected reaction chambers, and different gasification agents are respectively introduced into these reaction chambers to realize the sieving of solid fuel particles and provide appropriate gasification atmospheres for the feedstock with different particle size ranges. In this manner, the gasification reaction is more efficient. The reactor is compact in structure and is of small occupying area. Using this reactor to gasify solid fuels, no complicated crushing and sieving treatments of feedstock are required before the gasification, and wide feedstock adaptability, simplified process, high efficient conversion, and low cost are achieved simultaneously.

(2) In the present disclosure, a conical gas collecting hood is arranged directly below the feed inlet, which not only realizes the uniform distribution of the feed particles but also gathers the gasification products. In addition, the louver arranged at the opening of the gas collecting hood plays both roles in disturbing the gas flow and prolonging the residence time of the particles, which helps to achieve a more complete gasification reaction.

(3) In the present disclosure, each gas chamber is separated from the corresponding reaction chamber by the distributor, and the distributor resistance makes the gas flow pass through the distributor with uniform velocity, thereby providing a good gas-solid contact condition in each reaction chamber. In the first reaction chamber and the third reaction chamber, the high-speed flow of gasification agent fluidizes the fine feedstock particles and realizes the sieving of feedstock particles. In this manner, it is possible to facilitate the gasification reaction of feedstock with different particle sizes.

(4) In the present disclosure, a gas-solid separator is arranged in the second reaction chamber to separate the products in the third reaction chamber, so that the gasification reaction is more thorough. The separator adopts an abnormity structure shaped as square shell and cylindrical inner chamber in favour of the integration of the separator with the second reaction chamber and high separation efficiency. Moreover, the inner wall of the gas-solid separator is made of wear-resistant corundum mullite materials, which increase the friction between the particles and the inner wall. In this manner, it is possible to reduce particle size and expedite further reaction.

(5) The present disclosure utilizes the waste heat recovery equipment and the multi-stage heat exchange devices to recover the physical heat from the high-temperature gas and the high-temperature slag, so as to generate/heat the steam and heat the oxygen, which are used as the gasification agents. In this manner, no additional heating devices are required and the energy consumption is reduced remarkably.

BRIEF DESCRIPTION OF THE DRAWINGS

In the drawings, the same reference numerals are used to refer to the same elements or structures.

DESCRIPTION OF THE EMBODIMENTS

In order to make the purpose, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure.

Figure 1:
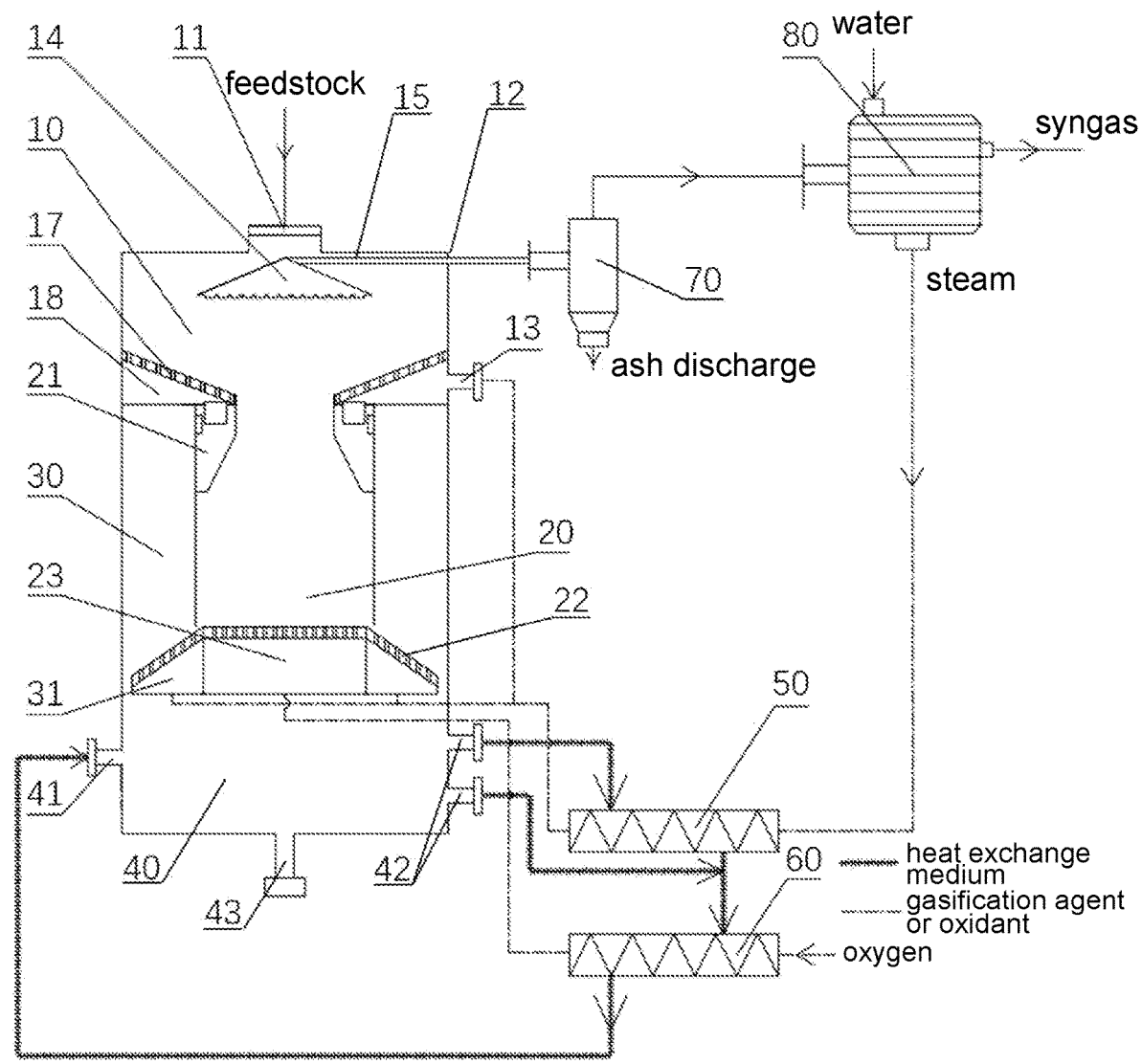
FIG. 1 is a schematic diagram of the structure of a gasification reactor according to an embodiment of the present disclosure.

As shown in FIG. 1, a gasification reactor adaptable for feedstock with wide particle size distribution provided by the present disclosure includes a reactor body. The reactor body includes interconnected a first reaction chamber 10, a second reaction chamber 20, and a third reaction chamber 30. The second reaction chamber 20 and the third reaction chamber 30 are both located below the first reaction chamber 10. The third reaction chamber 30 is annular and sleeved on the outer periphery of the second reaction chamber 20. Specifically, the bottom of the first reaction chamber 10 is connected to the top of the second reaction chamber 20, the bottom of the second reaction chamber 20 is connected to the bottom of the third reaction chamber 30, and the top of the third reaction chamber 30 is connected to the bottom of the first reaction chamber 10.

The top of the first reaction chamber 10 is provided with a feed inlet 11 and a gas outlet 12. The feedstock with wide particle size distribution falls from the feed inlet 11. The side wall of the first reaction chamber 10 is provided with a first vent 13, through which gasification agent is introduced to fluidize the fine feedstock particles falling into the first reaction chamber 10 and the gasification reaction occurs. The gasification products in the first reaction chamber 10 are discharged from the gas outlet 12. A second vent is provided at the bottom of the second reaction chamber 20 and used to supply oxidant. The coarse particles in the first reaction chamber 10 that have not undergone gasification reaction or have not reacted completely fall into the second reaction chamber 20 and form a granular bed where these particles undergo an oxidation reaction and release heat, and the generated gas rises and enters the first reaction chamber 10. As the granular bed in the second reaction chamber 20 is gradually moving downward, the bottom particles enter the third reaction chamber 30. At the bottom of the third reaction chamber 30, a third vent is configured to introduce gasification agent, so that the particles that have not reacted completely in the second reaction chamber 20 are further gasified herein, and the generated gas rises and enters the first reaction chamber 10.

The gasification reactor of the disclosure provides suitable gasification atmospheres for feedstock with different particle size ranges by setting up multi-stage reaction chambers, and realizes complete gasification of the feedstock with wide particle size distribution through staged gasification, hence improving the gasification efficiency and product quality.

The gasification reactor of the present disclosure is adaptable for converting solid fuels into syngas, which mainly includes carbon monoxide and hydrogen. The solid fuels may be any one of coal, coke, biomass, organic solid waste, or a mixture of various feedstocks with different properties. The gasification agents include air, oxygen, steam, carbon dioxide, etc. The main components of the gasification agent mentioned in the present disclosure are steam and carbon dioxide. The carbon in the solid fuels reacts with the gasification agent. The chemical reactions that may occur in the first reaction chamber 10 and the third reaction chamber 30 are shown in the following equations (1), (2), (3), and (4). The oxidant mentioned in the present disclosure is also a gasification agent, and the main component thereof is oxygen. The chemical reactions that may occur in the second reaction chamber 20 are shown in the following equations (4), (5), and (6).

$$C + H_2O(g) \xrightleftharpoons[]{\text{high temperature}} CO + H_2 \quad (1)$$

$$C + 2H_2O(g) \xrightleftharpoons[]{\text{high temperature}} CO_2 + 2H_2 \quad (2)$$

$$CO + H_2O(g) \xrightleftharpoons[]{\text{high temperature}} CO_2 + H_2 \quad (3)$$

$$C + CO_2 \xrightleftharpoons[]{\text{high temperature}} 2CO \quad (4)$$

$$2C + CO_2 = 2CO \quad (5)$$

$$C + O_2 = CO_2 \quad (6)$$

The above technical solutions are described in detail below with reference to specific embodiments.

Referring to FIG. 1, the first reaction chamber 10 is located above the second reaction chamber 20 and the third reaction chamber 30. A gas collecting device is provided in the first reaction chamber 10, which includes a gas collecting hood 14 and a gas duct 15. The gas collecting hood 14 is used to gather the gases in the first reaction chamber 10 and discharge them out of the reactor body through the gas duct 15 and the gas outlet 12. Specifically, the gas collecting hood 14 is close to the top of the first reaction chamber 10, the bottom of the gas collecting hood 14 is open, one end of the gas duct 15 is connected to the top of the gas collecting hood 14, and the other end of the gas duct 15 is connected to the gas outlet 12. The first reaction chamber 10 is provided with an inclined annular distributor 17 near the bottom thereof, which divides the interior of the first reaction chamber 10 into the first annular gas chamber 18. In this manner, the gasification agent introduced through the first vent 13 enters the first annular gas chamber 18, and then is evenly spread into the first reaction chamber 10 through the holes on the annular distributor 17. Specifically, the slope angle of the annular distributor 17 ranges from 30° to 60°.

In a preferred embodiment, the gas collecting hood 14 is conical and located directly below the feed inlet 11, so that the feedstock fed from the feed inlet 11 is evenly dispersed around the gas collecting hood 14, and then falls into the reaction zone in the first reaction chamber 10.

Figure 2:
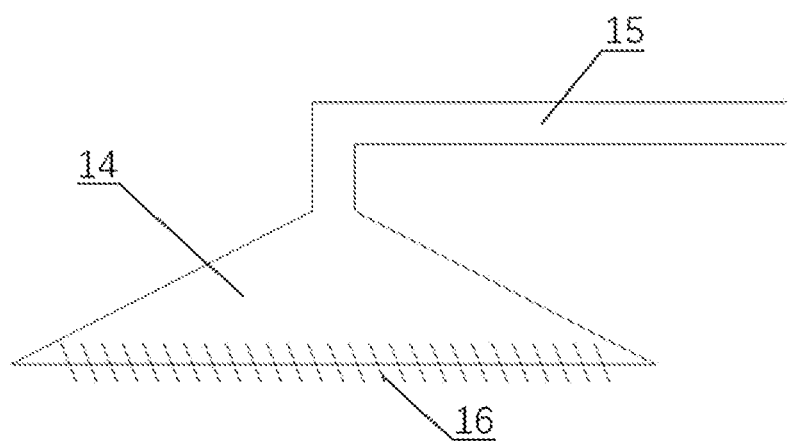
FIG. 2 is a schematic diagram of the structure of a gas collecting device according to an embodiment of the present disclosure.

In a more preferred embodiment, referring to FIG. 2, a plurality of angle-adjustable louvers 16 are provided at the bottom opening of the gas collecting hood 14 in order to intercept the entrained particles in the upward gas flow, thereby prolonging their residence time in the reaction zone and achieve a complete gasification. The slope angle of the louvers 16 may be adjusted. By setting different numbers of louvers 16, the distance between two adjacent louvers 16 is also adaptively adjustable, and the louvers 16 may be provided with one or more layers, which may be designed to adapt to the solid fuels with different particle size ranges, and no further description is incorporated herein. Moreover, the louvers 16 may be fixed or detachable at the bottom of the gas collecting hood 14. The detachable installation facilitates cleaning and replacement of the louvers 16, thus preventing that the particles block the louvers 16, which will decrease the gasification efficiency.

The reactor body also includes a distributor 22 spanning the second reaction chamber 20 and the third reaction chamber 30. A gap is provided between the distributor 22 and the interior wall between the second reaction chamber 20 and the third reaction chamber 30, so as to communicate the bottoms of the second reaction chamber 20 and the third reaction chamber 30. In this manner, the incompletely reacted feedstock particles may enter the third reaction chamber 30 for further gasification reaction. In the meantime, the completely reacted solid residues (mainly derived from the ash in the feedstock) will be agglutinated into large-size slag at high temperature, which will also enter the third reaction chamber 30 with the downward movement of the granular bed. Specifically, the distributor 22 includes a middle portion and an annular portion surrounding the periphery of the middle portion. The middle portion of the distributor 22 is located in the second reaction chamber 20 and divides the interior of the second reaction chamber 20 into the oxidant gas chamber 23. In this manner, the oxidant introduced through the second vent enters the oxidant gas chamber 23, and then is evenly spread into the second reaction chamber 20 through the holes at the middle portion of the distributor 22. The annular portion of the distributor 22 is located in the third reaction chamber 30 and divides the interior of the third reaction chamber 30 into the second annular gas chamber 31. In this manner, the gasification agent introduced through the third vent enters the second annular gas chamber 31, and then is evenly spread into the third reaction chamber 30 through the holes on the annular portion of the distributor 22. Preferably, the annular portion of the distributor 22 is inclined downward, and an annular gap is left between the annular portion of the distributor 22 and the side wall of the third reaction chamber 30, through which the remaining slag after the reaction is discharged. The slope angle is preferably from 30° to 60°.

At least one first gas-solid separator 21 is further arranged in the second reaction chamber 20 in the circumferential direction near the top thereof. The first gas-solid separator 21 may be a cyclone separator or a square separator. The interior wall between the second reaction chamber 20 and the third reaction chamber 30 has the same number of through holes as provided in the first gas-solid separator 21. The inlet of the first gas-solid separator 21 is connected to the third reaction chamber 30 via the through hole. The gas outlet of the first gas-solid separator 21 is connected to the first annular gas chamber 18. Specifically, each first gas-solid separator 21 is fixedly arranged on the interior wall between the second reaction chamber 20 and the third reaction chamber 30 and the bottom of the first annular gas chamber 18 is provided with the same number of through holes as provided in the first gas-solid separator 21. The gas outlet of the first gas-solid separator 21 is connected to the first annular gas chamber 18 via the through hole. The gas-solid mixture at the top of the third reaction chamber 30 is led to the inlet of the first gas-solid separator 21. After gas-solid separation, the gas enters the first annular gas chamber 18 from the gas outlet of the first gas-solid separator 21, and is mixed with the introduced gasification agent and evenly spread into the first reaction chamber 10 through the holes on the annular distributor 17, thereby jointly gasifying the feedstock particles. The solids are discharged from the solid outlet of the first gas-solid separator 21 and fall into the second reaction chamber 20 again for recycling reaction. In another embodiment, the bottom of the first annular gas chamber 18 is also the top surface of the first gas-solid separator 21, so the gas outlet of the first gas-solid separator 21 simultaneously serves as the the through hole at the bottom of the first annular air chamber 18.

In a preferred embodiment, the first gas-solid separator 21 has a square shell, namely is square separator, which facilitates the further integration of the first gas-solid separator 21 with the second reaction chamber 20. Meanwhile, the first gas-solid separator 21 has a conventional cylindrical inner chamber to ensure a high separation efficiency of the first gas-solid separator 21. The inner wall material of the first gas-solid separator 21 adopts wear-resistant corundum mullite, which increases the friction between the particles and the inner wall. In this manner, it is possible to reduce the particle size and promote the gasification reaction.

In a preferred embodiment, the pipes connecting the first vent 13, the second vent, and the third vent are all provided with flow control valves, which are configured to control the flow rates of the gasification agent and the oxidant in order to achieve the sieving of the particles with different sizes.

Continuing to refer to FIG. 1, the gasification reactor in this embodiment further includes a heat exchange device. The reactor body further includes a cooling slag chamber 40. The cooling slag chamber 40 is located below the third reaction chamber 30 and is connected to the third reaction chamber 30. After the reaction, the remaining slag falls into the cooling slag chamber 40 through the annular gap between the distributor 22 and the side wall of the third reaction chamber 30. The side wall of the cooling slag chamber 40 is provided with one inlet of heat exchange medium 41 and at least one outlet of heat exchange medium 42. The inlet of heat exchange medium 41 is connected to the outlet of the heat exchange device, and the outlet of heat exchange medium 42 is connected to the inlet of the heat exchange device. The bottom of the cooling slag chamber 40 is provided with a slag discharge port 43 for discharging the cooled slag after heat exchange.

Specifically, the heat exchange device includes a high-temperature heat exchanger 50 and a low-temperature heat exchanger 60. Two outlets of heat exchange medium 42 are provided along the height of the cooling slag chamber 40. The upper outlet of heat exchange medium 42 is connected to the heat flow inlet of the high-temperature heat exchanger 50, and the lower outlet of heat exchange medium 42 is connected to the heat flow inlet of the low-temperature heat exchanger 60. Furthermore, the heat flow inlet of the low-temperature heat exchanger 60 is also connected to the cold flow outlet of the high-temperature heat exchanger 50. The heat flow outlet of the high-temperature heat exchanger 50 is connected to the first vent and the third vent, the heat flow outlet of the low-temperature heat exchanger 60 is connected to the second vent, and the cold flow outlet of the low-temperature heat exchanger 60 is connected to the inlet of heat exchange medium 41. The cold flow inlet of the high-temperature heat exchanger 50 is fed with steam, and after heat exchange, high-temperature steam is formed, which serves as the gasification agent in the reactor. The cold flow inlet of the low-temperature heat exchanger 60 is fed with oxygen, and after heat exchange, high-temperature oxygen is formed, which serves as the oxidant in the reactor.

The gasification reactor in this embodiment further includes a second gas-solid separator 70 and a waste heat recovery equipment 80. The inlet of the second gas-solid separator 70 is connected to the gas outlet 12 of the first reaction chamber 10, and the gas outlet of the second gas-solid separator 70 is connected to the inlet of the waste heat recovery equipment 80. Specifically, the waste heat recovery equipment 80 may be a steam generator, where water is heated and turns into steam by absorbing the heat of the exhaust gas from the reactor. The steam outlet of the waste heat recovery equipment 80 can be connected to the cold flow inlet of the high-temperature heat exchanger 50, and the steam is effectively utilized as the gasification agent after being heated to form high-temperature steam.

The operation process of the gasification reactor of the present disclosure is described below, and the specific operation process of the gasification reactor is as follows.

The feedstock with wide particle size distribution is fed from the feed inlet 11 and evenly dispersed around the gas collecting hood 14, and then falls into the first reaction chamber 10.

The fine particles will be entrained by the gasification agent introduced from the holes on the annular distributor 17 and undergo gasification reaction. The gas flows generating in the first reaction chamber 10 and the second reaction chamber 20 gather towards the gas collecting hood 14. In the meantime, the louvers 16 at the bottom of the gas collecting hood 14 will intercept some larger particles and prolong their gasification time.

The coarse particles that cannot be entrained by the the gasification agent will slide into the second reaction chamber 20 along the inclined annular distributor 17, and move downward with the granular bed. During this process, the coarse particles meet the injected oxidant and undergo an exothermic reaction. The generated gas rises and enters the first reaction chamber 10, and is finally captured by the gas collecting hood 14. In the meantime, the completely reacted solid residues will be agglutinated into large-size slag at high temperature.

Under the guiding action of the distributor 22, the materials at the bottom of the second reaction chamber 20 enters the third reaction chamber 30, and the completely reacted slag continues to fall into the cooling slag chamber 40 through the annular gap. The incompletely reacted particles are fluidized by the introduced gasification agent, and the gasification reaction continues to proceed. The gas flow entraining particles in the third reaction chamber 30 enters the first gas-solid separator 21, where the gas and solid particles are separated by centrifugal force. The gas enters the first annular gas chamber 18 and is mixed with the introduced gasification agent, and then enters the first reaction chamber 10 through the holes on the annular distributor 17, and is finally captured by the gas collecting hood 14. The size of solid particles therein will be decreased due to the contact and friction with the rough inner wall of the first gas-solid separator 21. After the separation, the particles fall into the second reaction chamber 20 again; and multiple times of gasification and oxidation reactions are performed until the reaction is complete.

The gas captured by the gas collecting hood 14 is first dedusted by the second gas-solid separator 70, and then cooled by the waste heat recovery equipment 80 to generate the steam required for the gasification, and finally a syngas product is obtained.

In the cooling slag chamber 40, the heat exchange medium absorbs the sensible heat of the slag and is heated. The heated heat exchange medium located in the upper of the cooling slag chamber 40 has a higher temperature and forms a high-temperature heat exchange medium, while the heated heat exchange medium located in the lower the cooling slag chamber 40 has a lower temperature and forms a relatively low-temperature heat exchange medium. The high-temperature heat exchange medium is used for the high-temperature heat exchanger 50 to reheat the steam from the waste heat recovery equipment 80, and the cooled high-temperature heat exchange medium and the low-temperature heat exchange medium are used together to preheat oxygen in the low-temperature heat exchanger 60. The cooled slag is discharged from the slag discharge port 43, and the heat exchange medium from the low-temperature heat exchanger 60 returns to the cooling slag chamber 40, so as to realize the recycling of the heat exchange medium.

Those skilled in the art can easily understand that the above are only preferred embodiments of the present disclosure, and are not intended to limit the present disclosure. Any modifications, equivalent replacements, and improvements made within the spirit and principles of the present disclosure and so on should fall within the protection scope of the present disclosure.

What is claimed is:

1. A gasification reactor adaptable for feedstock with wide particle size distribution, comprising:
   a reactor body comprising a first reaction chamber, a second reaction chamber, and a third reaction chamber, which are connected with each other, wherein:
   a top of the first reaction chamber is provided with a feed inlet and a gas outlet;
   both the second reaction chamber and the third reaction chamber are located below the first reaction chamber, and the third reaction chamber is sleeved on an outer periphery of the second reaction chamber;
   a side wall of the first reaction chamber is provided with a first vent, and the first vent is configured for introducing a first gasification agent;
   a bottom of the second reaction chamber is provided with a second vent, and the second vent is configured for introducing an oxidant; and
   a bottom of the third reaction chamber is provided with a third vent, and the third vent is configured for introducing a second gasification agent,
   wherein a gas collecting device is provided in the first reaction chamber, the gas collecting device comprises a gas collecting hood with a bottom opening and a gas duct, the gas collecting hood is close to the top of the first reaction chamber, one end of the gas duct is connected to the top of the gas collecting hood, and the other end of the gas duct, far from the gas collecting hood, is connected to the gas outlet,
   wherein angle-adjustable louvers are provided at the bottom opening of the gas collecting hood, and
   wherein an inclined annular distributor is provided in the first reaction chamber near the bottom thereof, and the annular distributor divides an interior of the first reaction chamber into a first annular gas chamber so that the first gasification agent introduced from the first vent enters the first annular gas chamber, and then is evenly spread into the first reaction chamber through holes on the annular distributor.

2. The gasification reactor according to claim 1, wherein the gas collecting hood is conical and is located directly below the feed inlet.

3. The gasification reactor according to claim 1, wherein at least one first gas-solid separator is arranged inside the second reaction chamber near the top thereof, the same number of at least one through hole as provided in the at least one first gas-solid separator is opened on an outer wall of the second reaction chamber and the at least one through hole is located between the second reaction chamber and the third reaction chamber, an inlet of the at least one first gas-solid separator is connected to the third reaction chamber via the at least one through hole, and a gas outlet of the at least one first gas-solid separator is connected to the holes on the annular distributor.

4. The gasification reactor according to claim 1, wherein the reactor body further comprises a distributor spanning the second reaction chamber and the third reaction chamber, the distributor divides an interior of the second reaction chamber into an oxidant gas chamber so that the oxidant introduced through the second vent enters the oxidant gas chamber, and then is evenly spread into the second reaction chamber through holes on the distributor; the distributor divides an interior of the third reaction chamber into a second annular gas chamber so that the second gasification agent introduced through the third vent enters the second annular gas chamber, and then is evenly spread into the third reaction chamber through the holes on the distributor.

5. The gasification reactor according to claim 1, further comprising a heat exchange device, wherein the reactor body further comprises a cooling slag chamber, and the cooling slag chamber is located below the third reaction chamber and is connected to the third reaction chamber, a side wall of the cooling slag chamber is provided with a heat exchange medium inlet and at least one heat exchange medium outlet, the heat exchange medium inlet is connected to an outlet of the heat exchange device, and the at least one heat exchange medium outlet is connected to an inlet of the heat exchange device.

6. The gasification reactor according to claim 1, further comprising a high-temperature heat exchanger and a low-temperature heat exchanger, wherein the reactor body further comprises a cooling slag chamber, and the cooling slag chamber is located below the third reaction chamber and is connected to the third reaction chamber, a side wall of the cooling slag chamber is provided with a heat exchange medium inlet and two heat exchange medium outlets comprising an upper heat exchange medium outlet and lower heat exchange medium outlet, the two heat exchange medium outlets are arranged along a height of the cooling slag chamber, the upper heat exchange medium outlet is connected to a heat flow inlet of the high-temperature heat exchanger, the lower heat exchange medium outlet is connected to a heat flow inlet of the low-temperature heat exchanger, the heat flow inlet of the low-temperature heat exchanger is also connected to a cold flow outlet of the high-temperature heat exchanger, a heat flow outlet of the high-temperature heat exchanger is connected to the third vent, a heat flow outlet of the low-temperature heat exchanger is connected to the second vent, and a cold flow outlet of the low-temperature heat exchanger is connected to the heat exchange medium inlet.

7. The gasification reactor according to claim 1, further comprising a second gas-solid separator and a waste heat recovery equipment, wherein an inlet of the second gas-solid separator is connected to the gas outlet, and a gas outlet of the second gas-solid separator is connected to an inlet of the waste heat recovery equipment.

\* \* \* \* \*